United States Patent
Huang

(10) Patent No.: US 9,216,485 B2
(45) Date of Patent: Dec. 22, 2015

(54) QUICK CLAMPING DEVICE ADAPTED FOR WORKTABLE

(71) Applicant: Chervon (HK) Limited, Wanchai (HK)

(72) Inventor: Yun Huang, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 295 days.

(21) Appl. No.: 13/886,920

(22) Filed: May 3, 2013

(65) Prior Publication Data

US 2013/0292892 A1   Nov. 7, 2013

(30) Foreign Application Priority Data

May 4, 2012   (CN) .......................... 2012 1 0135165

(51) Int. Cl.
| | | |
|---|---|---|
| *B23Q 3/02* | (2006.01) | |
| *B23Q 3/06* | (2006.01) | |
| *B25B 5/00* | (2006.01) | |
| *B25B 5/06* | (2006.01) | |

(52) U.S. Cl.
CPC ................ *B23Q 3/069* (2013.01); *B25B 5/006* (2013.01); *B25B 5/068* (2013.01)

(58) Field of Classification Search
USPC .................... 269/95, 169, 196, 204, 236, 285
See application file for complete search history.

(56) References Cited

U.S. PATENT DOCUMENTS

| | | | | |
|---|---|---|---|---|
| 3,051,204 | A * | 8/1962 | Gaskell | ........................... 33/437 |
| 3,096,975 | A * | 7/1963 | Irwin | ............................. 269/169 |
| 4,926,722 | A |  5/1990 | Sorensen et al. | |
| 5,170,682 | A | 12/1992 | Sorensen et al. | |
| 5,730,434 | A |  3/1998 | Schoene et al. | |
| 6,402,130 | B1 |  6/2002 | Price et al. | |
| 7,377,504 | B2 * |  5/2008 | Houldsworth | ................ 269/296 |
| 7,721,632 | B2 |  5/2010 | Chen | |

* cited by examiner

*Primary Examiner* — Lee D Wilson
*Assistant Examiner* — Shantese McDonald
(74) *Attorney, Agent, or Firm* — Greenberg Traurig, LLP

(57) ABSTRACT

A quick clamp is adapted for a worktable, and includes a slide bar for clamping or loosening a workpiece by the sliding thereof, and a fixing rod fixedly connected to the worktable. The quick clamping device further includes a pushing mechanism for pushing the slide bar towards the worktable, and a locking mechanism for locking the slide bar at a position. At least some advantages of the present quick clamp include simplicity in structure and cost-effectiveness, and the assurance of a quick clamping and quick release functionality. The present quick clamp also provides simple operation and reliable clamping, while improving convenience and comfort of operation.

12 Claims, 1 Drawing Sheet

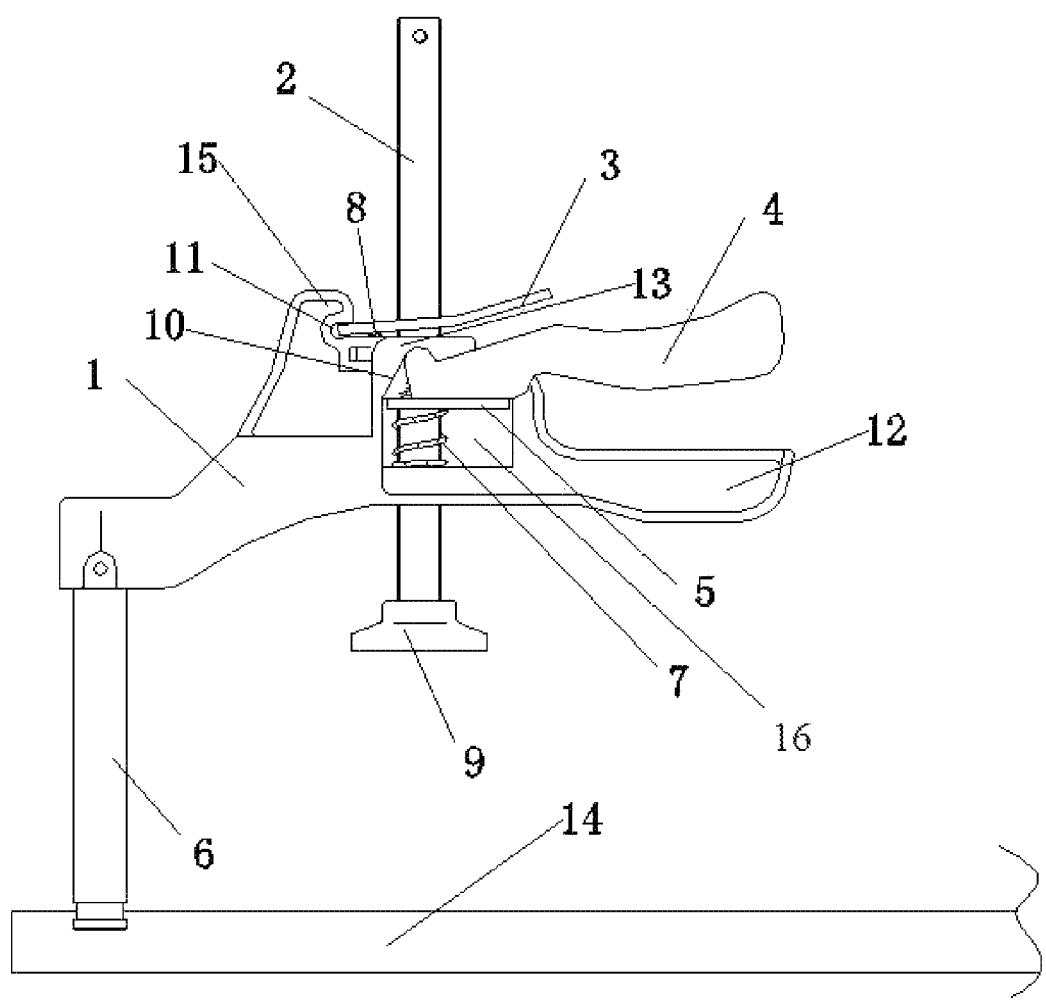

QUICK CLAMPING DEVICE ADAPTED FOR WORKTABLE

CROSS REFERENCE TO RELATED APPLICATION

This application is a non-provisional application claiming priority from Chinese Patent Application Serial No. 201210135165.0, filed May 4, 2012, incorporated herein by reference in its entirety.

FIELD OF THE DISCLOSURE

The present disclosure generally relates to a quick clamping device, and particularly to a quick clamping device adapted for a worktable.

BACKGROUND OF RELATED ART

Generally, when an electrical tool operates, an object to be processed usually needs to be clamped. As far as most electrical tools such as a mitre saw and a desktop saw are concerned, they usually employ a horizontal worktable. In order to clamp the object to be processed, typically a corresponding quick clamping device is provided on the worktable. The current quick clamping devices comprise clamping devices for locking in a threaded form, but they need to be rotated over and over during operation so that the operation is quite inconvenient and liable to cause fatigue. As an improvement, a quick clamping mechanism using principles of a lever or cam appears in the market. However, whatever mode is employed, an acting direction by a user's manual operation is often inconsistent with an actual clamping feeding direction. Therefore, the two kinds of quick clamping devices are relatively complex in structure and generally require complicated operation.

SUMMARY

In order to overcome at least some of the drawbacks in the prior art, the present disclosure aims to provide a quick clamping device which is simply structured and pragmatic and enables an operator to complete quick clamping and loosening action quickly and conveniently.

In order to achieve the above object, the present disclosure employs the following technical solution:

A quick clamping device adapted for a worktable, comprises a slide bar for clamping or loosening a workpiece by the sliding thereof, and a fixing rod fixedly connected to the worktable. The quick clamping device further comprises a pushing mechanism for pushing the slide bar towards the worktable, and a locking mechanism for locking the slide bar at a position.

The quick clamping device adapted for a worktable includes a pushing mechanism comprising a feed plate sleeved around the slide bar and achieving a feeding action by contacting with the slide bar when the feed plate itself gets inclined as it is pressed, a first spring member for driving the feed plate to move in a direction away from the worktable, and an operation lever for contacting with the feed plate to press down the feed plate, wherein the first spring member and the operation lever are located on both sides of the feed plate, respectively.

The quick clamping device adapted for a worktable wherein the locking mechanism comprises a brake piece sleeved around the slide bar and configured to lock, and a second spring member for driving the brake piece away from the feed plate.

The quick clamping device adapted for a worktable wherein the quick clamping device further comprises a main body provided with the operation lever and the brake piece which are rotatably connected thereto, the fixing rod and the main body constituting a fixed connection, and the slide bar and the main body constituting a sliding connection.

The quick clamping device adapted for a worktable wherein the main body is formed with a placement notch for receiving the first spring member and the feed plate and holding one end of the first spring member.

The quick clamping device adapted for a worktable wherein the main body is formed with a cantilever structure extending horizontally at a position above the placement notch.

The quick clamping device adapted for a worktable wherein a first rotation groove is formed in the lower portion of the cantilever structure, and constitutes a rotatable connection to the operation lever at a limited angle.

The quick clamping device adapted for a worktable wherein the main body is formed with an upwardly-formed mounting protrusion above the cantilever structure on the side away from the operation lever.

The quick clamping device adapted for a worktable wherein a second rotation groove is provided on the side of the mounting protrusion facing the slide bar and constitutes a rotatable connection to the above brake piece at a limited angle.

The quick clamping device adapted for a worktable wherein rotation axes of rotatable connection constituted by the first rotation groove and the second rotation groove are parallel to each other, and are both perpendicular to axes of the slide bar and the fixing rod.

The quick clamping device adapted for a worktable wherein at an end of the operation lever, a first rotation projection for cooperating with the first rotation groove is formed.

The quick clamping device adapted for a worktable wherein one end of the brake piece is disposed in the second rotation groove, and the other end thereof tilts in a direction away from the main body.

The quick clamping device adapted for a worktable wherein at a bottom end of the slide bar, a contact member having a horizontal bottom surface is provided.

The quick clamping device adapted for a worktable wherein the slide bar passes in order through the brake piece, the cantilever structure, the operation lever, the feed plate, the first spring member, and the portion of the main body where a placement notch is formed.

The quick clamping device adapted for a worktable wherein the main body is provided with a fixing handle for cooperating with the operation lever to facilitate hand gripping.

BRIEF DESCRIPTION OF THE DRAWINGS

FIG. 1 is a schematic view of a fast clamping device adapted for a worktable according to a one example of the present disclosure.

DETAILED DESCRIPTION

The following description of example methods and apparatus is not intended to limit the scope of the description to the precise form or forms detailed herein. Instead the following description is intended to be illustrative so that others may follow its teachings.

The present disclosure will be described in detail with reference to the drawing and a specific example.

Referring to FIG. 1, a quick clamping device adapted for a worktable according to one example the present disclosure comprises: a main body 1, a side bar 2 and a fixing rod 6. The main body 1 is provided with a brake piece 3 and an operation lever 4 thereon, and the main body 1 is rotatably connected to them.

The fixing rod 6 is fixedly connected to the main body 1 to fix a quick clamp device on a worktable 14 so that the whole quick clamping device obtains an effective fulcrum. In one example, taking the size of an object to be processed into consideration, the fixing rod 6 should be disposed on the main body 1 at a certain distance from the slide bar 2 to obtain a space for placement of the object.

The slide bar 2 and the main body 1 constitute a sliding connection. During operation, clamping and loosening operations are performed by sliding the slide bar 2 itself to change a distance between a bottom surface of the slide bar and the worktable 14. Noticeably, a cross section of the example slide bar 2 is even and uniform in the sliding direction thereof, that is, an acting effect on the slide bar 2 exerted by a feed plate 5 and the brake piece 3 is consistent along an entirety of the slide bar 2. In this example, the cross section is rectangular.

In order to achieve the clamping by manual operation, the quick clamping device is further provided with a pushing mechanism for pushing the slide bar 2 towards the worktable to achieve the clamping. Specifically, the pushing mechanism includes the feed plate 5 sleeved around the slide bar 2 and achieving a feeding action by contacting with the slide bar 2 when the feed plate 5 is pressed and inclined, a first spring member 7 for driving the feed plate 5 to move in a direction away from the worktable 14 (i.e., automatically restore), and the operation lever 4 used for contacting with the feed plate 5 to press down the feed plate 5, wherein the first spring member 7 and the operation lever 4 are located on two sides of the feed plate 5 respectively. As such, when the operation lever 4 is pressed, it drives the feed plate 5 to perform a downward pressing action, as a result, the feed plate 5 itself is pressed and inclined to contact with the slide bar 2 and bias the slide bar 2 to enable the slide bar 2 to achieve the feeding action. The feeding actions may be performed many times so as to achieve the purpose of clamping the workpiece with various forces. Once the operation lever 4 is loosened, the feed plate 5 restores under action of the first spring member 7. In this example, the first spring member 7 is a spiral spring.

Meanwhile, the quick clamping device is further provided with a locking mechanism for reliably fixing the slide bar 2 at a position so as to ensure reliable clamping. Specifically, the locking mechanism comprises the brake piece 3 sleeved around the slide bar 2 and used for locking, and a second spring member 8 for driving the brake piece 3 away from the feed plate 5, namely, for driving the brake piece 3 to automatically restore. The locking mechanism as shown in FIG. 1 is in a locked state in which the brake piece 3 applies an acting force to the slide bar 2 to prevent it from moving and works on a principle similar to the principle of the pushing mechanism: achieving locking by using a friction force between members. When the brake piece 3 is pressed down, the acting force exerted on the slide bar 2 by the brake piece 3 disappears so as to achieve quick loosening. When the brake piece 3 is loosened, the brake piece 2 automatically restores under action of the second spring member 8 to return to the locked state. In this example, the second spring member 8 is a spiral spring.

The quick clamping device according to the present disclosure is simply structured. The main body 1 is formed with a placement notch 16 for receiving the first spring member 7 and the feed plate 5 and holding one end of the first spring member 7, and a cantilever structure 13 extending horizontally above the placement notch 16. The cantilever structure 13 is preferably integrally formed with the main body 1. Meanwhile, a first rotation groove 10 is formed in the lower portion of the cantilever structure 13. The main body 1 is formed with a mounting protrusion 15 above the cantilever structure 13 on the side away from the operation lever 4, and a second rotation groove 11 is provided on the side of the mounting protrusion 15 facing the slide bar 2. The first rotation groove 10 is adapted for constituting a rotatable connection to the operation lever 4 at a limited angle, the second rotation groove 11 is adapted for constituting a rotatable connection to the brake piece 3 at a limited angle. Rotation axes for constituting the two rotatable connections are parallel to each other, and are perpendicular to axes of the slide bar 2 and the fixing rod 6.

The example operation lever 4 is formed at its one end with a first rotation projection for cooperating with the first rotation groove 10. One end of the brake piece 3 is disposed in the second rotation groove 11, and the other end thereof tilts in a direction away from the main body 1.

Further, the slide bar 2 is provided at its bottom end with a contact member 9 having a horizontal bottom surface. The contact member 9 has a larger contact area so that the workpiece can be clamped more reliably.

Generally, the slide bar 2 passes in order through the brake piece 3, the cantilever structure 13, the operation lever 4, the feed plate 5, the first spring member 7, and the portion of the main body 1 where the placement notch 16 is formed. Hence, the above members should have or be formed with a structure allowing the slide bar 2 to pass therethrough and having a shape similar to the cross-sectional shape of the slide bar 2.

In order to further improve comfort in operation, the example main body 1 is formed with a fixing handle 12 for cooperating with the operation lever 4 to facilitate hand gripping, and gripping portions of the operation lever 4 and the fixing handle 12 are both designed as an arcuate shape conforming to ergonomics and improving operation comfort.

Noticeably, structures such as the main body 1, the operation lever 4, the cantilever structure 13 and the mounting protrusion 15 may be integrally formed of a plastic material, so the quick clamping device according to the one example of the present disclosure is of lower costs than conventional quick clamping devices.

In the figure, reference numbers denote parts as follows:
1 main body; 2 slide bar; 3 brake piece; 4 operation lever; 5 feed plate; 6 fixing rod; 7 first spring member; 8 second spring member; 9 contact member; 10 first rotation groove; 11 second rotation groove; 12 fixing handle; 13 cantilever structure; 14 worktable; 15 mounting protrusion; 16 placement notch.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

I claim:

1. A quick clamping device adapted for a worktable, comprising:
   a main body;

a slide bar for clamping or loosening a workpiece by the sliding thereof, the slide bar being slidably connected to the main body;

a fixing rod fixedly connected to the worktable and supporting the main body;

a pushing mechanism carried by the main body for pushing the slide bar towards the worktable wherein the pushing mechanism comprises a feed plate sleeved around the slide bar and achieving a feeding action by contacting with the slide bar when the feed plate itself is pressed and inclined, a first spring member sleeved around the slide bar for driving the feed plate to move in a direction away from the worktable, and an operation lever having a first side for contacting with the feed plate to press down the feed plate, and wherein the first spring member and the operation lever are located on both sides of the feed plate, respectively; and a locking mechanism for locking the slide bar at a position wherein the locking mechanism comprises a brake piece rotatably mounted to the main housing and sleeved around the slide bar on a second side of the operation lever opposite to first side and configured to lock and a second spring member for driving the brake piece away from the feed plate.

2. The quick clamping device adapted for a worktable according to claim 1, wherein the main body is formed with a placement notch for receiving the first spring member and the feed plate and holding one end of the first spring member.

3. The quick clamping device adapted for a worktable according to claim 2, wherein the main body is formed with a cantilever structure extending horizontally at a position above the placement notch.

4. The quick clamping device adapted for a worktable according to claim 3, wherein the slide bar passes in order through the brake piece, the cantilever structure, the operation lever, the feed plate, the first spring member, and the portion of the main body where a placement notch is formed.

5. The quick clamping device adapted for a worktable according to claim 3, wherein the main body is provided with a fixing handle for cooperating with the operation lever to facilitate hand gripping.

6. The quick clamping device adapted for a worktable according to claim 3, wherein a first rotation groove is formed in the lower portion of the cantilever structure, and constitutes a rotatable connection to the operation lever at a limited angle.

7. The quick clamping device adapted for a worktable according to claim 6, wherein the main body is formed with an upwardly-formed mounting protrusion above the cantilever structure on the side away from the operation lever.

8. The quick clamping device adapted for a worktable according to claim 7, wherein a second rotation groove is provided on the side of the mounting protrusion facing the slide bar and constitutes a rotatable connection to the brake piece at a limited angle.

9. The quick clamping device adapted for a worktable according to claim 8, wherein rotation axes of rotatable connection constituted by the first rotation groove and the second rotation groove are parallel to each other, and are both perpendicular to axes of the slide bar and the fixing rod.

10. The quick clamping device adapted for a worktable according to claim 9, wherein the operation lever is formed at its one end with a first rotation projection for cooperating with the first rotation groove.

11. The quick clamping device adapted for a worktable according to claim 9, wherein one end of the brake piece is disposed in the second rotation groove, and the other end thereof tilts in a direction away from the main body.

12. The quick clamping device adapted for a worktable according to claim 1, wherein the slide bar is provided at its bottom end with a contact member having a horizontal bottom surface.

* * * * *